US006982862B2

(12) United States Patent
Kobayashii (10) Patent No.: US 6,982,862 B2
(45) Date of Patent: Jan. 3, 2006

(54) MULTILAYER CAPACITOR

(75) Inventor: Ryo Kobayashii, Tokyo (JP)

(73) Assignee: TDK Corporation, Tokyo (JP)

(*) Notice: Subject to any disclaimer, the term of this patent is extended or adjusted under 35 U.S.C. 154(b) by 5 days.

(21) Appl. No.: 10/959,191

(22) Filed: Oct. 7, 2004

(65) Prior Publication Data

US 2005/0094351 A1    May 5, 2005

(30) Foreign Application Priority Data

Oct. 30, 2003   (JP) .............................. 2003-369974

(51) Int. Cl.
*H01G 4/228* (2006.01)
(52) U.S. Cl. .............................. 361/306.1; 361/321.2; 361/321.5
(58) Field of Classification Search ................ 361/303, 361/306.1, 306.3, 309, 311–313, 321.1, 321.2, 361/321.5; 29/25.41, 25.42
See application file for complete search history.

(56) References Cited

U.S. PATENT DOCUMENTS

| | | | | |
|---|---|---|---|---|
| 4,353,957 A | * | 10/1982 | Rutt et al. .................. | 428/110 |
| 4,931,849 A | * | 6/1990 | Tajima ........................ | 257/296 |
| 5,072,329 A | * | 12/1991 | Galvagni ................. | 361/321.2 |
| 5,550,705 A | * | 8/1996 | Moncrieff .................. | 361/313 |
| 6,542,352 B1 | * | 4/2003 | Devoe et al. ............ | 361/321.2 |

FOREIGN PATENT DOCUMENTS

JP         2000-124064         4/2000

OTHER PUBLICATIONS

U.S. Appl. No. 10/959,191, filed Oct. 7, 2004, Kobayashi.
U.S. Appl. No. 10/958,288, filed Oct. 6, 2004, Kobayashi.

* cited by examiner

*Primary Examiner*—Anthony Dinkins
(74) *Attorney, Agent, or Firm*—Oblon, Spivak, McClelland, Maier & Neustadt, P.C.

(57) ABSTRACT

A multilayer capacitor includes a multilayer body as a main body of the multilayer capacitor, in which a plurality of internal electrodes and stacked dielectric layers each interposed between the internal electrodes are disposed and dielectrics are disposed on an outer periphery side of the plural internal electrodes, the multilayer body being formed in a rectangular parallelepiped shape with a width dimension of 2 mm or less, wherein: margin portions, in which no internal electrode exists, between end faces of the multilayer body and end portions of the internal electrodes are disposed on both end sides of the internal electrodes respectively; and a margin ratio which is a ratio of a dimension of each of the margin portions to the width dimension of the multilayer body is set to a percentage within a range of 10% to 25% per one-side margin portion of the multilayer body. Therefore, a multilayer capacitor is obtained that not only can realize both downsizing and higher capacity, but also has reliability not lowered with time.

19 Claims, 7 Drawing Sheets

MULTILAYER CAPACITOR

BACKGROUND OF THE INVENTION

1. Field of the Invention

The present invention relates to a multilayer capacitor that not only can realize both downsizing and higher capacity, but also has reliability not lowered with time, and more particularly, to that suitable for use as a multilayer ceramic chip capacitor.

2. Description of the Related Art

A multilayer capacitor such as a multilayer ceramic chip capacitor having a sandwich structure in which dielectric layers made of ceramic and internal electrodes are stacked has been conventionally known. As a device on which such a multilayer capacitor is to be mounted is becoming more downsized and coming to have a higher performance, further downsizing of the multilayer capacitor and further increase in its capacitance are rapidly underway in recent years. In order to realize both downsizing and higher capacity of the multilayer capacitor, it is basically necessary to reduce the thickness per layer of the dielectric layers to make a further multilayered structure.

Further, in the multilayer capacitor, there exist dummy portions formed only of dielectrics and serving as margins on upper, lower, right, and left sides of a portion formed of a stack of dielectric layers and internal electrodes. In recent years, these upper, lower, right, and left dummy portions without any internal electrode tend to be reduced in size in accordance with the aforesaid downsizing and increase in capacity.

Conventionally, on the other hand, the size of the dummy portions has not been specifically stipulated, and the dimension to a degree not causing a lowered yield in a manufacturing process of the multilayer capacitors was secured. However, in order to exclude defective products, not only the total inspection of the multilayer capacitors before shipment is conducted for checking their electric properties, but also a high voltage is applied for screening in order to exclude products having a low level of withstand voltage and thus not satisfying a predetermined specification.

Figure 6:
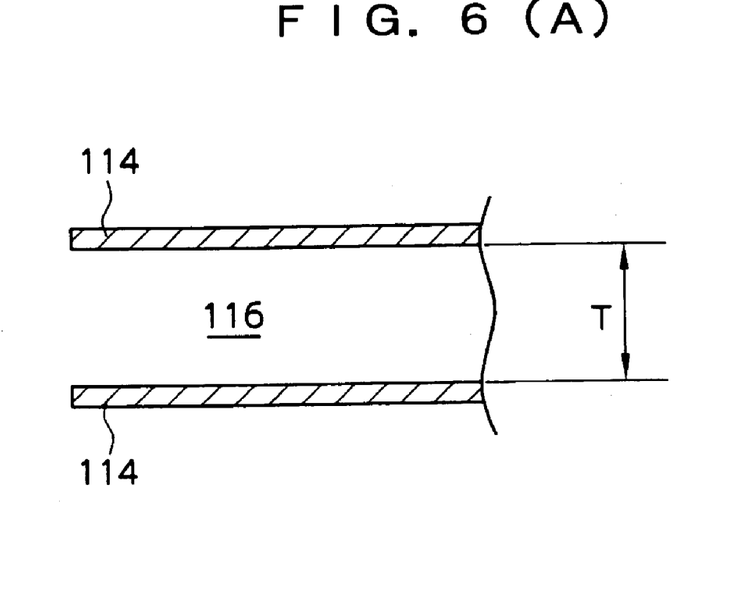
FIG. 6(A) is an enlarged fragmentary cross-sectional view of the multilayer capacitor to explain the expansion of a dielectric layer and is a view showing the state before voltage application.
FIG. 6(B) is an enlarged fragmentary cross-sectional view of the multilayer capacitor to explain the expansion of the dielectric layer and is a view showing the state after the voltage application.

However, since ceramic which is a ferroelectric substance exhibits a property as a piezoelectric element, it expands when a high voltage is applied thereto. Therefore, when a high voltage is applied to the multilayer capacitor, a thickness dimension T of a portion of a dielectric layer 116 sandwiched between internal electrodes 114 greatly expands from the state shown in FIG. 6(A) to be brought into the state shown in FIG. 6(B), while the expansion of dummy portions to which practically no high voltage is applied is small.

Figure 7:
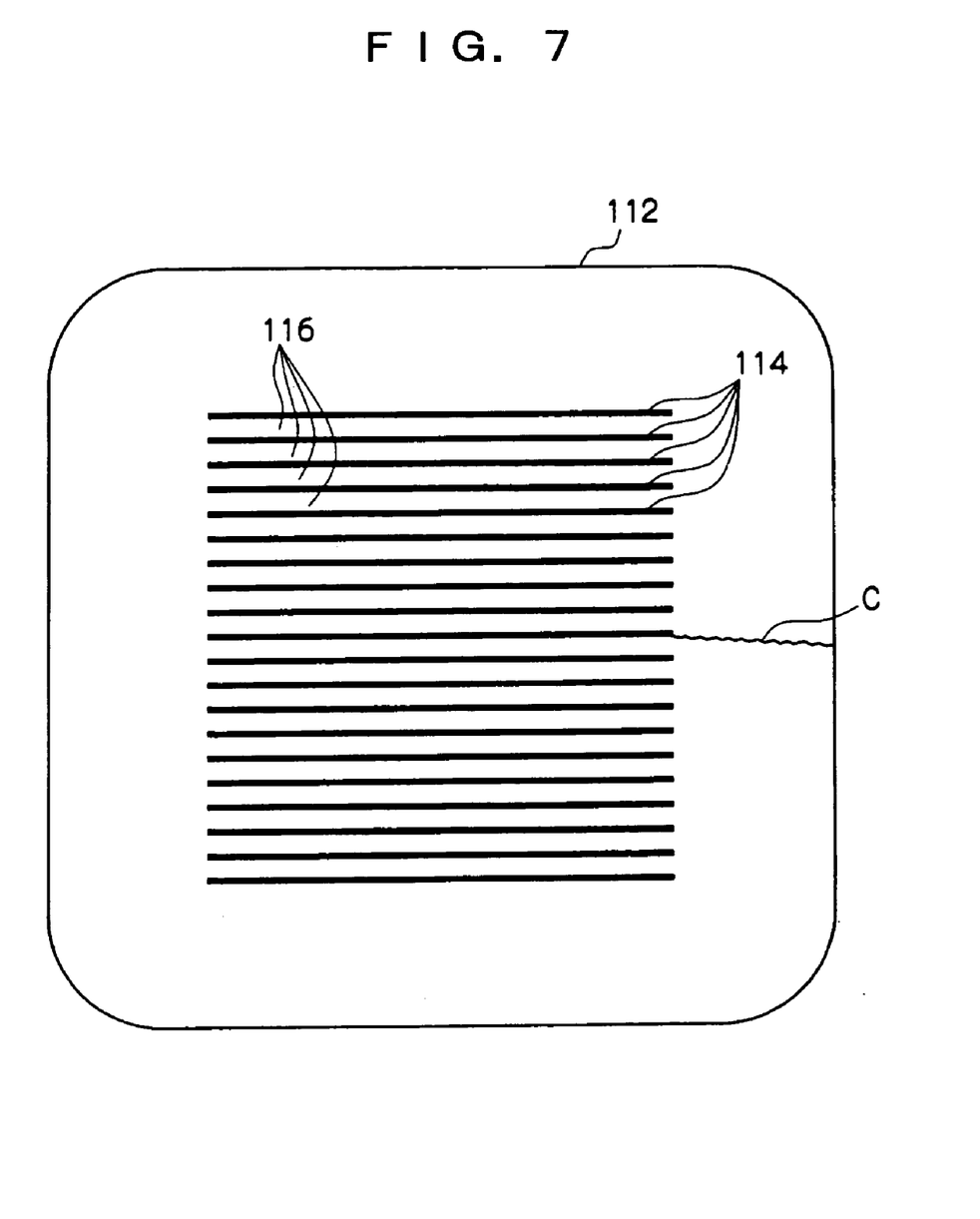
FIG. 7 is a cross-sectional view showing a conventional multilayer capacitor.

Consequently, a difference in expansion between these portions sometimes causes a crack C in a multilayer body 112 shown in FIG. 7 since ceramic has no malleability. When the crack C exists in the multilayer body 112, reliability of the multilayer capacitor may possibly be lowered with time.

SUMMARY OF THE INVENTION

In view of the above-described situation, it is an object of the present invention to provide a multilayer capacitor that not only can realize both downsizing and higher capacity, but also has reliability not lowered with time.

According to one of the modes of the present invention, provided is a multilayer capacitor including a multilayer body as a main body of the multilayer capacitor, in which a plurality of internal electrodes and stacked dielectric layers each interposed between the internal electrodes are disposed and dielectrics are disposed on an outer periphery side of the plural internal electrodes, the multilayer body being formed in a rectangular parallelepiped shape with a width dimension of 2 mm or less, wherein: margin portions, in which no internal electrode exists, between end faces of the multilayer body and end portions of the internal electrodes are disposed on both end sides of the internal electrodes respectively; and a margin ratio which is a ratio of a dimension of each of the margin portions to the width dimension of the multilayer body is set to a percentage within a range of 10% to 25% per one-side margin portion of the multilayer body.

Such a multilayer capacitor has the following operations.

In the multilayer capacitor according to this mode, the multilayer body formed in the rectangular parallelepiped shape in which the plural internal electrodes and the stacked dielectric layers each interposed between the internal electrodes are disposed and the dielectrics are disposed on the outer periphery side of the internal electrodes constitutes the main body of the multilayer capacitor, and the width dimension of this multilayer body is 2 mm or less. Further, the margin portions in which no internal electrode exists are disposed between the end faces of the multilayer body and the end portions of the internal electrodes on both of the end sides of the internal electrodes respectively, and the margin ratio which is a ratio of the dimension of each of the margin portions to the width dimension of the multilayer body is set to a percentage within the range of 10% to 25% per one-side margin portion of the multilayer body.

Therefore, in this mode, the ratio of the dimension of the margin portion in which no internal electrode exists but only the dielectrics exist is set to the percentage of 10% or higher relative to the width dimension of the multilayer body, so that the minimum necessary size is secured for the margin portions, which makes it possible to keep the strength of the margin portions at a predetermined level or more. Consequently, even when a high voltage is applied to deform the multilayer body due to the expansion of the portion formed of the stack of internal electrodes and dielectric layers, the margin portions having the strength at a predetermined level or more can withstand this deformation. As a result, a crack that may possibly occur in the multilayer body can be prevented owing to the increased strength of the multilayer body, and hence reliability is not lowered with time.

On the other hand, when the dimension of the margin portions becomes larger so that the ratio thereof to the width dimension of the multilayer body exceeds 25%, the area of the internal electrodes becomes too small. As a result, it is practically impossible to realize both downsizing and higher capacity of the multilayer capacitor. Therefore, an appropriate range of the margin ratio is considered to be 25% or lower.

As described above, according to this mode, it is possible to obtain a multilayer capacitor that realizes both downsizing and higher capacity and, in addition, that has reliability not lowered with time since a crack does not occur in the multilayer body even when a high voltage is applied thereto.

According to another mode of the present invention, provided is a multilayer capacitor including a multilayer body as a main body of the multilayer capacitor, in which a plurality of internal electrodes and stacked dielectric layers each interposed between the internal electrodes are disposed and dielectrics are disposed on an outer periphery side of the plural internal electrodes, the multilayer body being formed in a rectangular parallelepiped shape with a width dimension of 2 mm or less, wherein: a thickness per layer of the dielectric layers is 50 $\mu$m or less, and margin portions, in which no internal electrode exists, between end faces of the multilayer body and end portions of the internal electrodes are disposed on both end sides of the internal electrodes respectively; and a margin ratio which is a ratio of a dimension of each of the margin portions to the width dimension of the multilayer body is set to a percentage within a range of 10% to 25% per one-side margin portion of the multilayer body.

Such a multilayer capacitor has the following operations.

The multilayer capacitor according to this mode includes the same structure as that of the multilayer capacitor of the above-described mode. In addition, it has the structure such that the thickness per layer of the dielectric layers is 50 μm or less. Therefore, the same operations as those of the above-described mode are achieved, and in addition, since the dielectric layers are formed as thin dielectric layers whose thickness per layer is 50 μm or less, the multilayer body does not become large even when a large number of such dielectric layers are stacked. This more surely enables both downsizing and higher capacity of the multilayer capacitor.

DETAILED DESCRIPTION OF THE PREFERRED EMBODIMENT

Hereinafter, an embodiment of the multilayer capacitor according to the present invention will be described based on the drawings.

As shown in FIG. 1 to FIG. 5, a multilayer capacitor 10 being a multilayer ceramic chip capacitor according to an embodiment of the present invention has as a main body thereof a dielectric element 12 being a multilayer body in a rectangular parallelepiped shape obtained by sintering a stack of a plurality of ceramic green sheets which are dielectric sheets.

Figure 1:
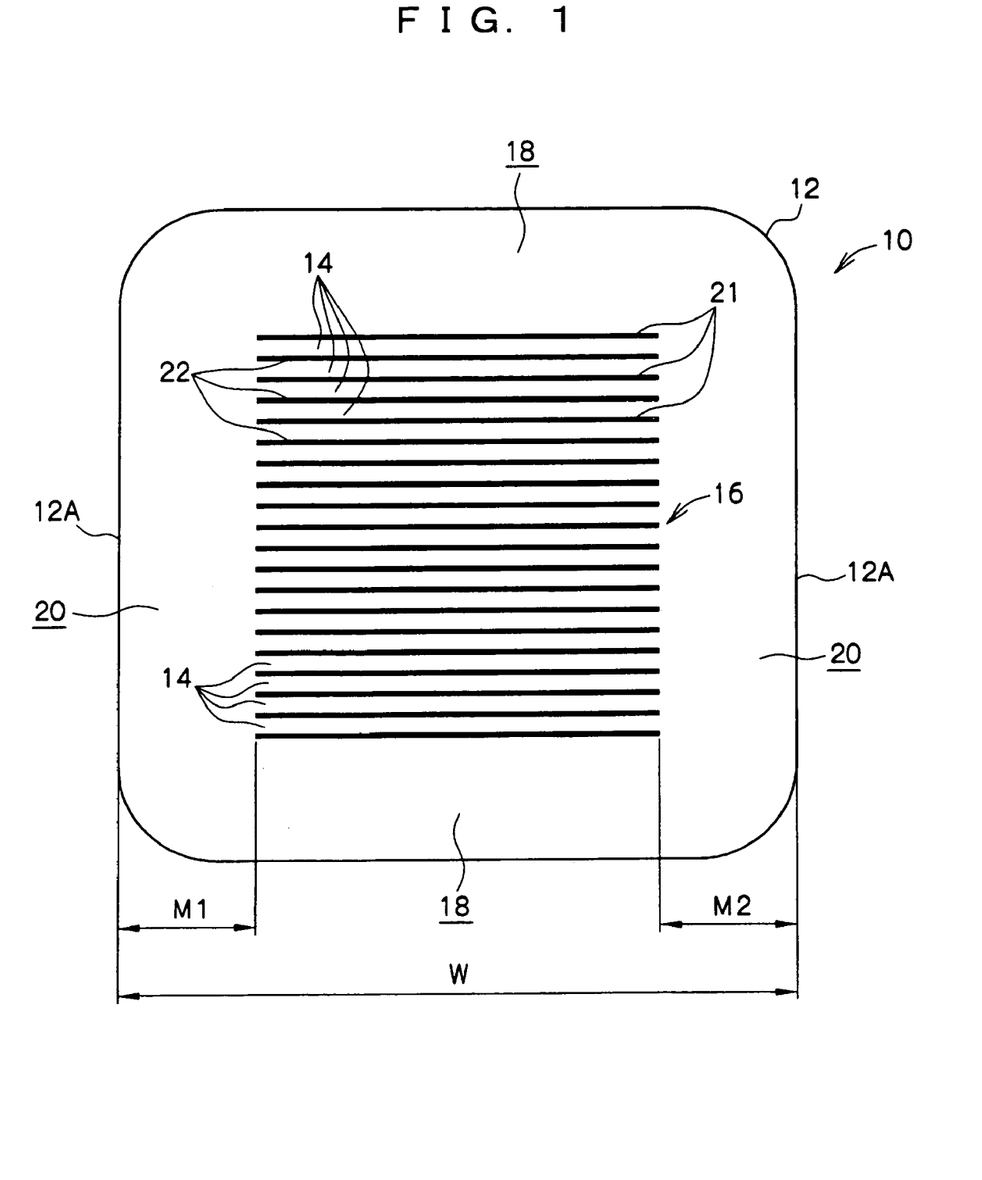
FIG. 1 is a cross-sectional view showing a multilayer capacitor according to an embodiment of the present invention and is a view corresponding to a cross section taken along the 1—1 line shown by the arrows in FIG. 3.
Figure 2:
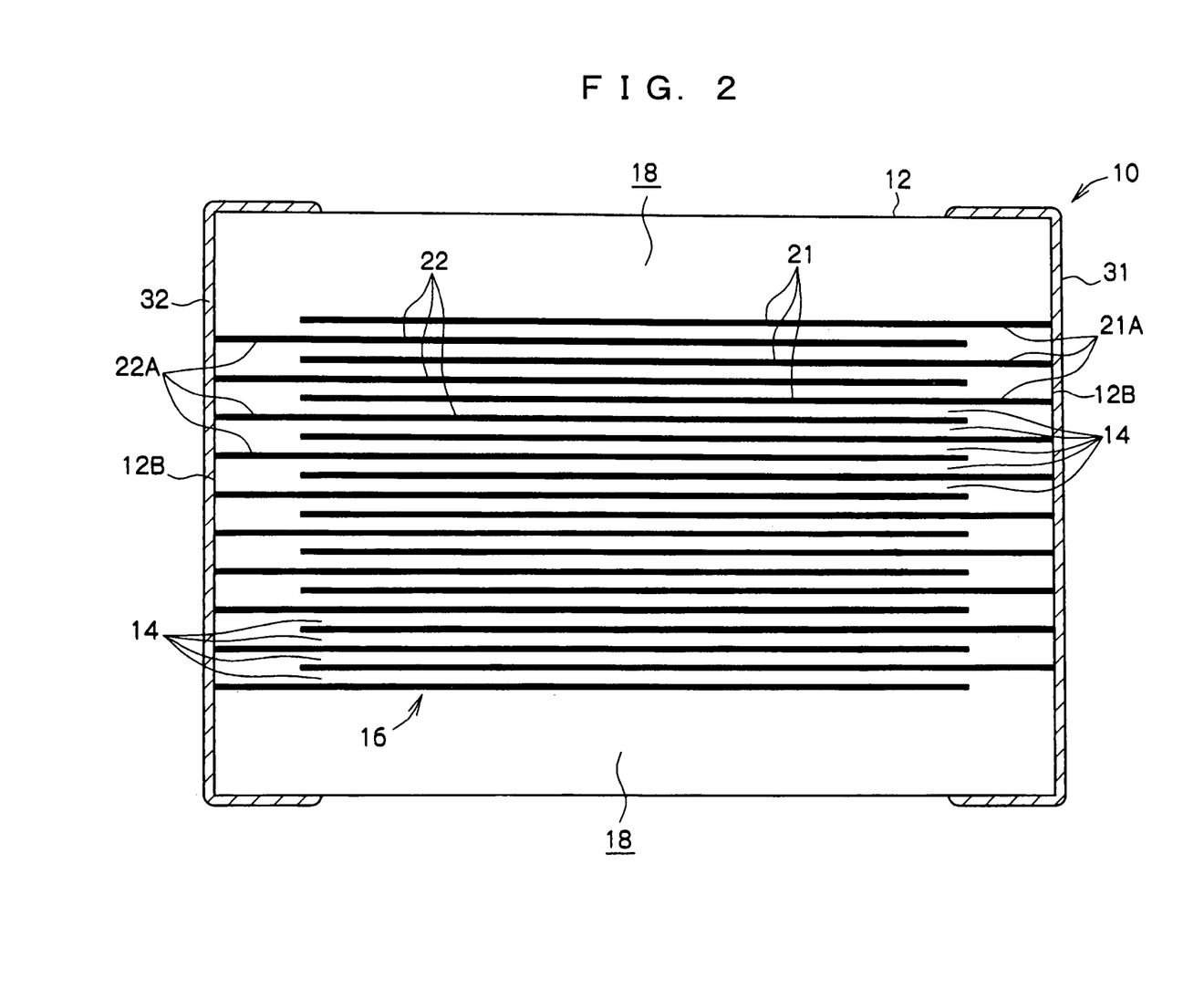
FIG. 2 is a cross-sectional view showing the multilayer capacitor according to the embodiment of the present invention and is a view corresponding to a cross section taken along the 2—2 line shown by the arrows in FIG. 3.
Figure 5:
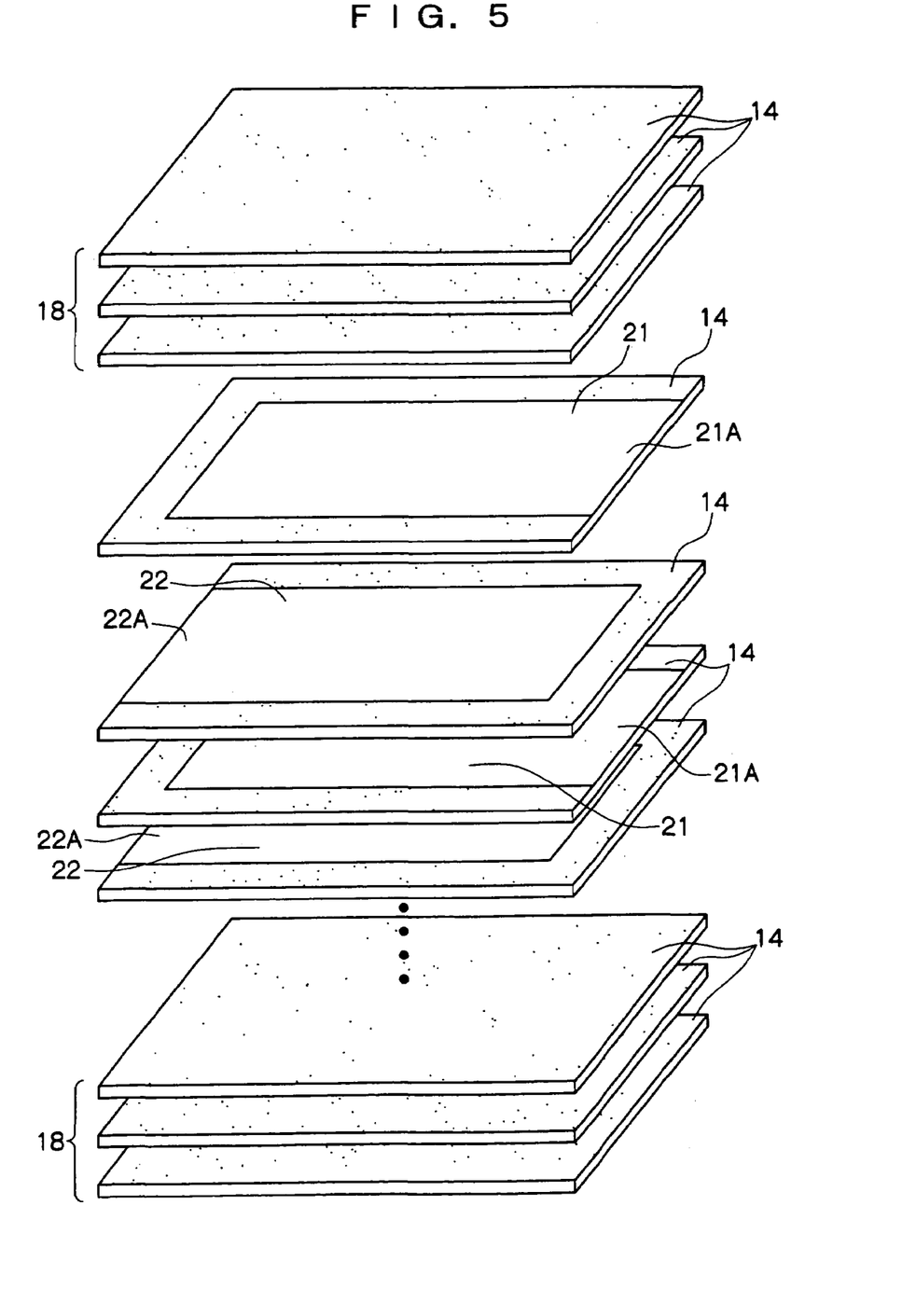
FIG. 5 is an exploded perspective view of the multilayer capacitor according to the embodiment of the present invention.

As shown in FIG. 1, FIG. 2, and FIG. 5, an internal electrode 21 formed in a rectangular shape is disposed at a predetermined height position in this dielectric element 12.

A leadout portion 21A formed to have the same width as the width of the internal electrode 21 is led out from a right end side in FIG. 2 and FIG. 5 of the internal electrode 21.

An internal electrode 22 formed in a rectangular shape is further disposed in the dielectric element 12 under the internal electrode 21 across a ceramic layer 14 which is a sintered ceramic green sheet. A leadout portion 22A formed to have the same width as the width of the internal electrode 22 is led out from a left end side in FIG. 2 and FIG. 5 of the internal electrode 22.

Further, under this internal electrode 22 across a ceramic layer 14 in the dielectric element 12, an internal electrode 21 having the same shape as that of the aforesaid internal electrode 21 is disposed. Under this internal electrode 21 across a ceramic layer 14 in the dielectric element 12, an internal electrode 22 having the same shape as that of the aforesaid internal electrode 22 is disposed. Hereafter, a large number of the internal electrodes 21 and internal electrodes 22 are stacked, being alternately arranged in a similar manner. Note that these ceramic layers 14 are also formed in a rectangular shape, and the internal electrodes 21, 22 are positioned substantially in center portions of the respective ceramic layers 14.

As described above, a large number of these internal electrodes 21 and internal electrodes 22 are stacked to face each other, being separated by the ceramic layers 14 which are dielectric layers. Further, an electrode multilayer portion 16 is formed such that each of the stacked ceramic layers 14 is disposed between the plural internal electrodes 21, 22 as shown in FIG. 1 and FIG. 2. Protective layers 18 formed of a stack of a plurality of only ceramic layers 14 are disposed on an upper side and a lower side of this electrode multilayer portion 16 respectively.

These plural ceramic layers 14 including the electrode multilayer portion 16 and the protective layers 18 constitute the dielectric element 12 in a rectangular parallelepiped shape. A width dimension W of the dielectric element 12 being the multilayer body shown in FIG. 1 is 2 mm or less, for example, 1.2 mm. In this case, the thickness per layer of the ceramic layers 14 constituting the dielectric element 12 is 50 μm or less. Further, for example, totally 80 layers of the internal electrodes, specifically, 40 sheets of the internal electrodes 21 and 40 sheets of the internal electrodes 22, are disposed, but a larger number of layers may be disposed. As a material of these internal electrodes, conceivable is, for example, nickel, a nickel alloy, copper, or a copper alloy.

As shown in FIG. 1, end faces 12A of the dielectric element 12 are formed on both end sides of the electrode multilayer portion 16, respectively, in which the plural internal electrodes 21 and the plural internal electrodes 22 exist. Between the end faces 12A and end portions of the internal electrodes 21, 22, margin portions 20 in which the internal electrodes 21, 22 do not exist and which are formed of a stack of only ceramic layers 14 being dielectrics are disposed respectively.

A left margin ratio which is a ratio of a widthwise dimension M1 of the margin portion 20 on the left side in FIG. 1 to the width dimension W of the dielectric element 12 is set to a percentage within a range of 10% to 25%. A right margin ratio which is a ratio of a widthwise dimension M2 of the margin portion 20 on the right side in FIG. 1 to the width dimension W of the dielectric element 12 is also set to a percentage within a range of 10% to 25%. Therefore, a margin ratio which is a ratio of each of the dimensions M1, M2 to the width dimension W is set to a percentage within 10% to 25% per one-side margin portion 20 of the dielectric element 12.

Further, these dimensions M1, M2 have a relation such that an absolute value of a ratio of a difference between these dimensions M1, M2 expressed as M1−M2 relative to an average value of these dimensions M1, M2 expressed as (M1+M2)/2 is set to a value not lower than 0 nor higher than 0.2.

Figure 3:
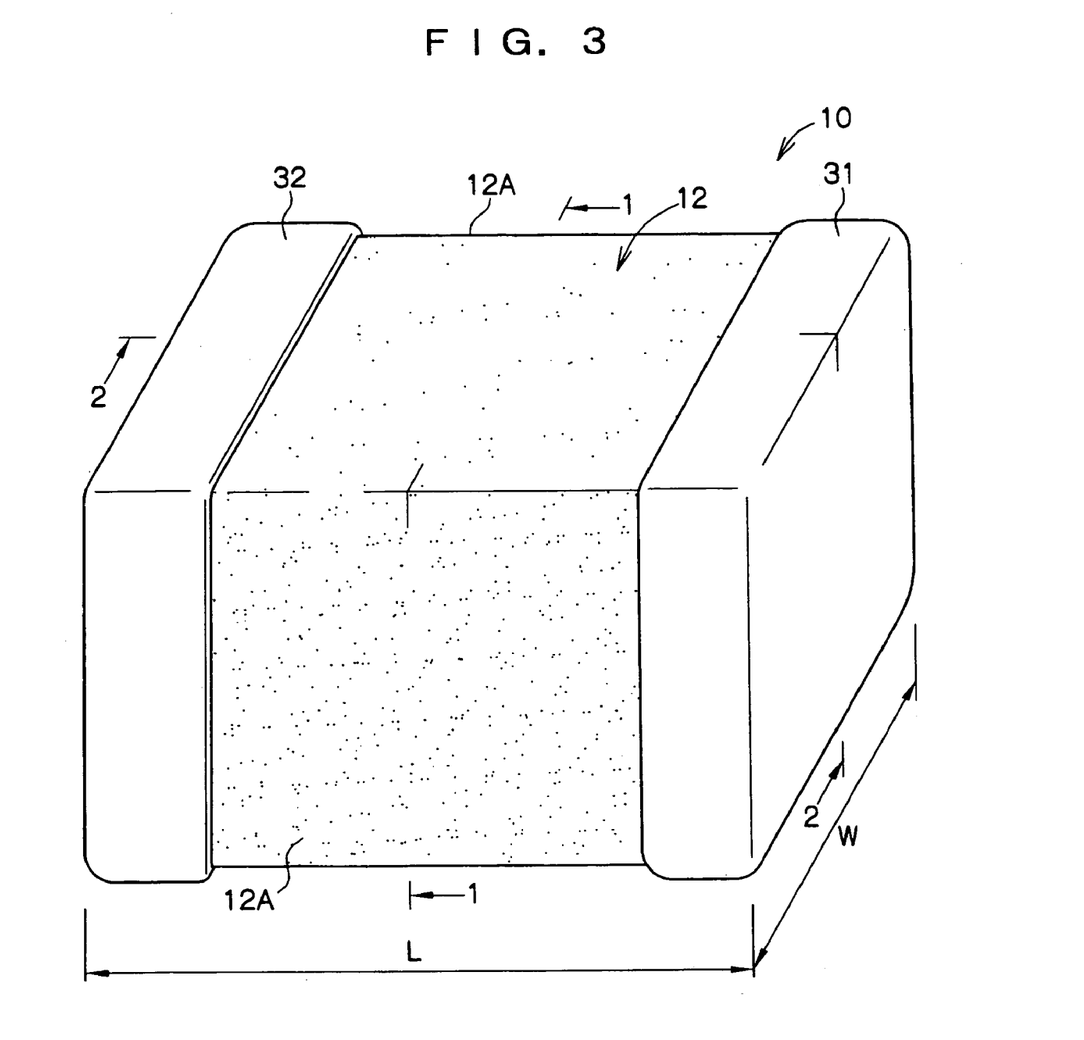
FIG. 3 is a perspective view showing the multilayer capacitor according to the embodiment of the present invention.
Figure 4:
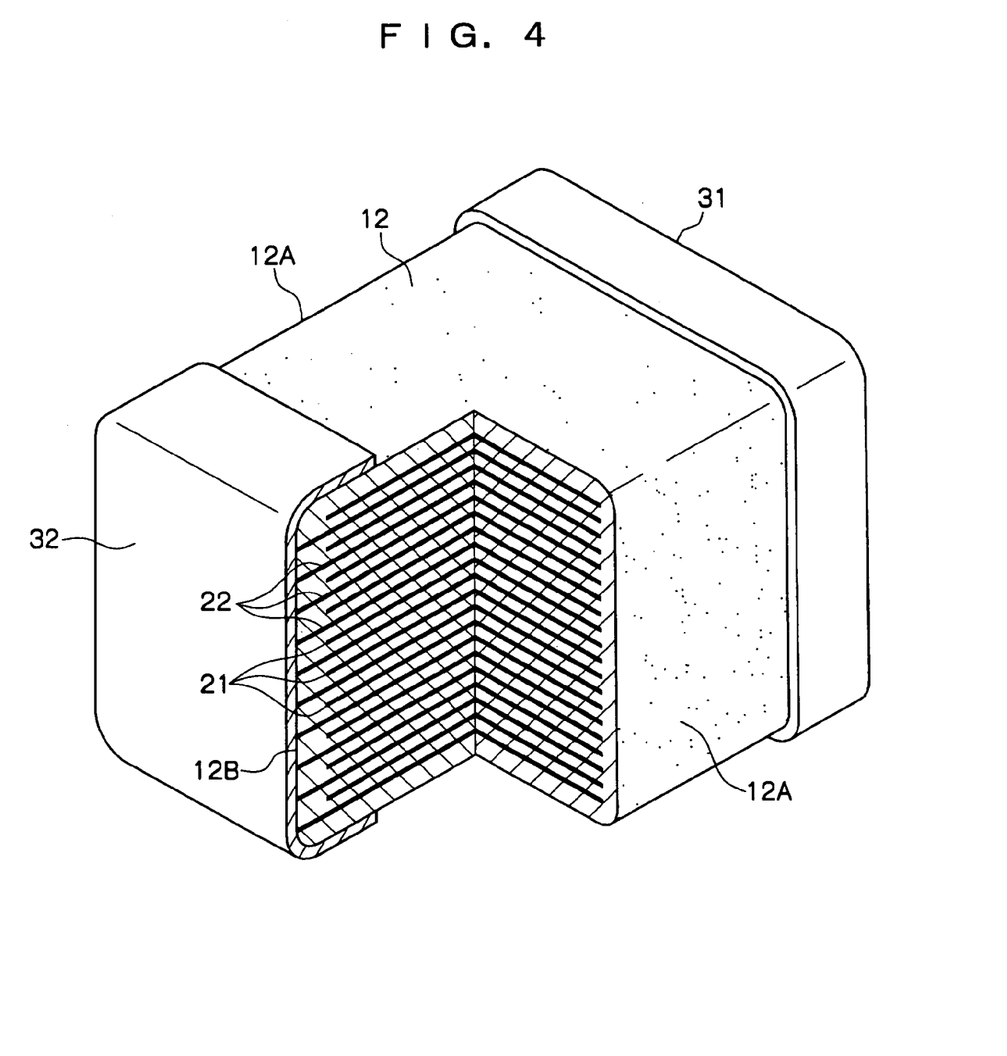
FIG. 4 is a perspective view showing the multilayer capacitor according to the embodiment of the present invention and is a partially cutaway view.

Further, a terminal electrode 31 is disposed on a right side face 12B of the dielectric element 12 as shown in FIG. 2 to FIG. 4 so as to be connected via the readout portions 21A to the internal electrodes 21 from which the leadout portions 21A are led out to the right end side which is one end side of the dielectric element 12. A terminal electrode 32 is also disposed on a left side face 12B of the dielectric element 12 as shown in FIG. 2 to FIG. 4 so as to be connected via the leadout portions 22A to the internal electrodes 22 from which the leadout portions 22A are led out to the left end side which is the other end side of the dielectric element 12.

As a result of the above, the multilayer capacitor 10 according to this embodiment has a structure such that the terminal electrodes 31, 32 are disposed respectively on the right and left side faces 12B facing each other of the dielectric element 12 in a rectangular parallelepiped shape. Further, the pair of terminal electrodes 31, 32 are connected to a not-shown circuit board via solder or the like, so that the multilayer capacitor 10 is mounted on the circuit board.

Next, the operations of the multilayer capacitor 10 according to this embodiment will be described.

According to the multilayer capacitor 10 of this embodiment, the plural internal electrodes 21 led out to the side face 12B on the right end side of the dielectric element 12 formed in a rectangular parallelepiped shape and the plural internal electrodes 22 led out to the side face 12B on the left end side of the dielectric element 12 are alternately arranged to be stacked, sandwiching each of the stacked ceramic layers 14 therebetween. In addition, the dielectric element 12 constituting the main body of the multilayer capacitor 10 is formed such that the width dimension W of the dielectric element 12 is 2 mm or less.

Further, portions formed of the stack of only ceramic layers 14 being dielectrics exist on outer periphery sides of the plural internal electrodes 21, 22 respectively. Accordingly, the margin portions 20, in which no internal electrode exists, between the end faces 12A of the dielectric element 12 and the end portions of the internal electrodes 21, 22 are disposed on both of the end sides of the internal electrodes 21, 22 respectively as shown in FIG. 1. The dielectric element 12 is formed to have a size such that the margin ratio per one-side margin portion 20 of the dielectric element 12 is set to a percentage within the range of 10% to 25%.

Moreover, in this embodiment, the terminal electrode 31 is disposed on the side face 12B on the right end side of the dielectric element 12 so as to be connected to the plural internal electrodes 21. Further, the terminal electrode 32 is disposed on the side face 12B on the left end side of the dielectric element 12 so as to be connected to the plural internal electrodes 22.

In short, in this embodiment, the margin ratio which is a ratio of each of the dimensions M1, M2 of the margin portions 20 in which no internal electrode exists but only the ceramic layers 14 exist is set to 10% or higher relative to the width dimension W of the dielectric element 12. Consequently, the minimum necessary size is secured for the margin portions 20, so that the strength of the margin portions 20 can be maintained at a predetermined level or more.

Accordingly, even when a high voltage is applied to deform the dielectric element 12 due to the expansion of the portion in which the internal electrodes and the ceramic layers 14 are stacked, the margin portions 20 having the strength at a predetermined level or more can withstand this deformation. As a result, since a crack which may possibly occur in the dielectric element 12 can be prevented owing to the increased strength of the dielectric element 12, reliability is not lowered with time.

On the other hand, when at least one of the dimensions M1, M2 of the margin portions 20 becomes larger so that the ratio thereof to the width dimension W of the dielectric element 12 exceeds 25%, the area of the internal electrodes becomes too small. As a result, it is practically impossible to realize both downsizing and higher capacity of the multilayer capacitor 10. Therefore, an appropriate range of the margin ratio is considered to be 25% or lower.

As described above, according to this embodiment, it is possible to obtain the multilayer capacitor 10 that realizes both downsizing and higher capacity, and in addition, that has reliability not lowered with time since no crack occurs in the dielectric element 12 even by high voltage application.

Further, in this embodiment, the adoption of the thin ceramic layers 14 whose thickness per one dielectric layer is 50 $\mu$m or less prevents the dielectric element 12 from becoming large even when a large number of such ceramic layers 14 are stacked. Therefore, such setting of the thickness of the dielectric layer makes it possible to more surely realize both downsizing and higher capacity of the multilayer capacitor 10.

Moreover, in this embodiment, the terminal electrode 31 is disposed on the side face 12B on the right end side of the dielectric element 12 so as to be connected to the plural internal electrodes 21 led out to the right end side of the dielectric element 12. The terminal electrode 32 is also disposed on the side face 12B on the left end side of the dielectric element 12 so as to be connected to the plural internal electrodes 22 led out to the left end side of the dielectric element 12.

Therefore, the terminal electrodes 31, 32 are disposed on both of the side faces 12B of the dielectric element 12 respectively to be connected to the plural internal electrodes 21 and the plural internal electrodes 22 respectively. The internal electrodes 21, 22 are connected to an external circuit board via these terminal electrodes 31, 32. Consequently, capacitance is surely ensured by the ceramic layers 14 interposed between the internal electrodes 21 and the internal electrodes 22.

Next, in order to confirm the effects of the present invention, the evaluation was made on a defective fraction attributed to an internal structural defect and a crack, the result of which will be explained below.

Specifically, 2012 size multilayer capacitors 10, as in this embodiment, with a length dimension L shown in FIG. 3 being 2.0 mm and the width dimension W being 1.2 mm, were used as samples, in each of which 80 layers of B characteristic materials were stacked, with the thickness per layer of the ceramic layers 14 being 10 $\mu$m.

At this time, the margin ratio which is a ratio of each of the dimensions M1, M2 of the margin portions 20 in which no internal electrode exists was set to 5%, 10%, 15%, and 20% respectively, relative to the width dimension W of the dielectric element 12, and a plurality of samples were prepared for each of the four types.

Further, the dielectric elements 12 to be the samples of the respective types were subjected to debinding at a temperature of 270° C. in order to remove binders used at the manufacturing time, and thereafter, these dielectric elements 12 were sintered at a temperature of 1250° C. Thereafter, the terminal electrodes 31, 32 were disposed on the side faces 12B of these dielectric elements 12 respectively, so that the multilayer capacitors 10 were completed.

Then, after a voltage of 500 V was applied to the multilayer capacitors 10 as the respective samples, internal structural defects were checked on 50 samples, and the external appearances of 1000 samples after being mounted on substrates were visually inspected to check cracks. The result is shown in the following Table 1.

TABLE 1

| evaluation item | margin ratio | | | |
|---|---|---|---|---|
| | 5% | 10% | 15% | 20% |
| internal structural defect (n = 50) | 2 | 0 | 0 | 0 |
| crack (n = 1000) | 31 | 0 | 0 | 0 |

It has been confirmed from the result in Table 1 that an internal structural defect and a crack both occur when the margin ratio is set to a percentage of only 5%. On the other hand, it has been found out that cracks can be prevented when the margin ratio is set to a percentage of 10% or higher, since neither internal structural defect nor crack occurred when the margin ratio was set within this range. This means that the effect of the present invention has been confirmed from this evaluation result. Moreover, the same effect as shown by this evaluation result was recognized also in the multilayer capacitors with the width dimension W being 0.3 mm to 6.0 mm.

Incidentally, it is conceivable to set a rated voltage of the multilayer capacitor 10 according to the above-described embodiment to 50 V or higher. Further, the multilayer capacitor 10 according to the above-described embodiment has 80 sheets of the internal electrodes 21, 22 and the two terminal electrodes 31, 32. However, the number of layers, the number of the internal electrodes, and the number of the terminal electrodes are not limited to these numbers, but may be larger. In addition, the present invention is not limited to the above-described embodiment, and may have a different structure.

According to the present invention, it is possible to obtain a multilayer capacitor that not only can realize downsizing and higher capacity, but also has reliability not lowered with time since a crack does not occur even when a high voltage is applied. Further, the present invention is an invention particularly suitable for use as a multilayer ceramic chip capacitor.

What is claimed is:

1. A multilayer capacitor comprising
a multilayer body as a main body of the multilayer capacitor, in which a plurality of internal electrodes and stacked dielectric layers each interposed between the internal electrodes are disposed and dielectrics are disposed on an outer periphery side of the plural internal electrodes, the multilayer body being formed in a rectangular parallelepiped shape with a width dimension of 2 mm or less,
wherein margin portions, in which no internal electrode exists, between end faces of the multilayer body and end portions of the internal electrodes are disposed on both end sides of the internal electrodes respectively, and
wherein a margin ratio which is a ratio of a dimension of each of the margin portions to the width dimension of the multilayer body is set to a percentage within a range of 10% to 25% per one-side margin portion of the multilayer body.

2. The multilayer capacitor according to claim 1, wherein the dielectric layers are ceramic layers made of sintered ceramic green sheets.

3. The multilayer capacitor according to claim 1,
wherein the plural internal electrodes are constituted of two kinds of internal electrodes, and a pair of terminal electrodes are disposed on two side faces facing each other of the multilayer body respectively, and
wherein the internal electrodes of one kind out of the two kinds of internal electrodes are connected to one of the pair of terminal electrodes, and the internal electrodes of the other kind are connected to the other one of the pair of terminal electrodes.

4. The multilayer capacitor according to claim 1, wherein the plural internal electrodes are positioned substantially in center portions of the respective dielectric layers.

5. The multilayer capacitor according to claim 1, wherein each of the plural internal electrodes is made of nickel, a nickel alloy, copper, or a copper alloy.

6. The multilayer capacitor according to claim 1, wherein protective layers are disposed respectively on an upper side and a lower side of a portion in which the plural internal electrodes and the stacked dielectric layers each interposed between the internal electrodes are disposed.

7. The multilayer capacitor according to claim 6, wherein each of the protective layers is formed of a stack of a plurality of only dielectric layers.

8. The multilayer capacitor according to claim 7, wherein the dielectric layers interposed between the internal electrodes and the dielectric layers forming the protective layers are both ceramic layers.

9. The multilayer capacitor according to claim 1, wherein an absolute value of a ratio of a difference between the dimensions of the pair of margin portions is set to a value not lower than 0 nor higher than 0.2 relative to an average value of the dimensions of the pair of margin portions disposed on both of the end sides of the internal electrodes respectively.

10. A multilayer capacitor comprising
a multilayer body as a main body of the multilayer capacitor, in which a plurality of internal electrodes and stacked dielectric layers each interposed between the internal electrodes are disposed and dielectrics are disposed on an outer periphery side of the plural internal electrodes, the multilayer body being formed in a rectangular parallelepiped shape with a width dimension of 2 mm or less,
wherein a thickness per layer of the dielectric layers is 50 $\mu$m or less, and margin portions, in which no internal electrode exists, between end faces of the multilayer body and end portions of the internal electrodes are disposed on both end sides of the internal electrodes respectively, and
wherein a margin ratio which is a ratio of a dimension of each of the margin portions to the width dimension of the multilayer body is set to a percentage within a range of 10% to 25% per one-side margin portion of the multilayer body.

11. The multilayer capacitor according to claim 10, wherein the number of the internal electrodes is 80 or more.

12. The multilayer capacitor according to claim 10, wherein the dielectric layers are ceramic layers made of sintered ceramic green sheets.

13. The multilayer capacitor according to claim 10,
wherein the plural internal electrodes are constituted of two kinds of internal electrodes, and a pair of terminal electrodes are disposed on two side faces facing each other of the multilayer body respectively, and
wherein the internal electrodes of one kind out of the two kinds of internal electrodes are connected to one of the pair of terminal electrodes, and the internal electrodes of the other kind are connected to the other one of the pair of terminal electrodes.

14. The multilayer capacitor according to claim 10, wherein the plural internal electrodes are positioned substantially in center portions of the respective dielectric layers.

15. The multilayer capacitor according to claim 10, wherein each of the plural internal electrodes is made of nickel, a nickel alloy, copper, or a copper alloy.

16. The multilayer capacitor according to claim 10, wherein protective layers are disposed respectively on an upper side and a lower side of a portion in which the plural internal electrodes and the stacked dielectric layers each interposed between the internal electrodes are disposed.

17. The multilayer capacitor according to claim 16, wherein each of the protective layers is formed of a stack of a plurality of only dielectric layers.

18. The multilayer capacitor according to claim 17, wherein the dielectric layers interposed between the internal electrodes and the dielectric layers forming the protective layers are both ceramic layers.

19. The multilayer capacitor according to claim 10, wherein an absolute value of a ratio of a difference between the dimensions of the pair of margin portions is set to a value not lower than 0 nor higher than 0.2 relative to an average value of the dimensions of the pair of margin portions disposed on both of the end sides of the internal electrodes respectively.

* * * * *